Patented July 24, 1951

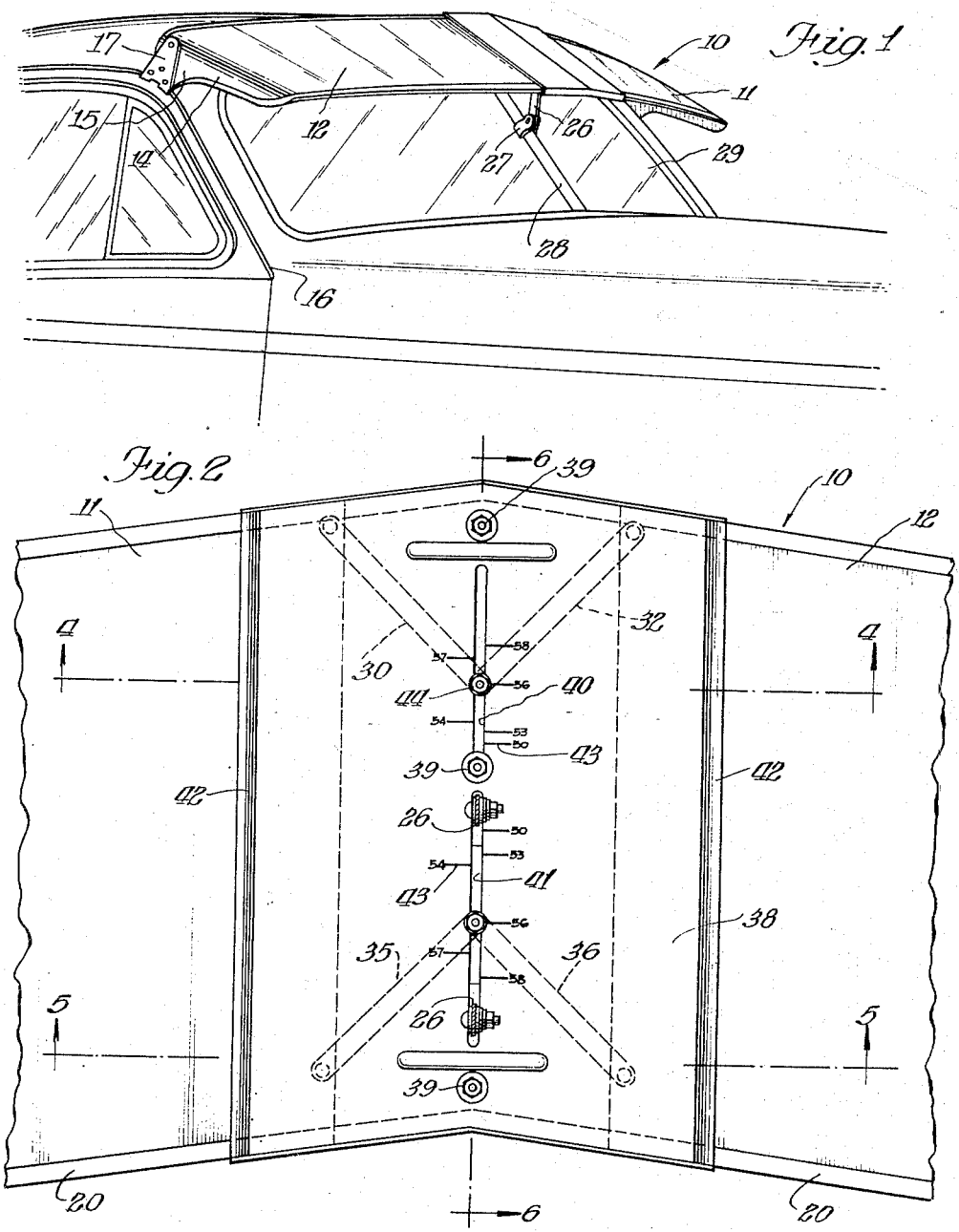

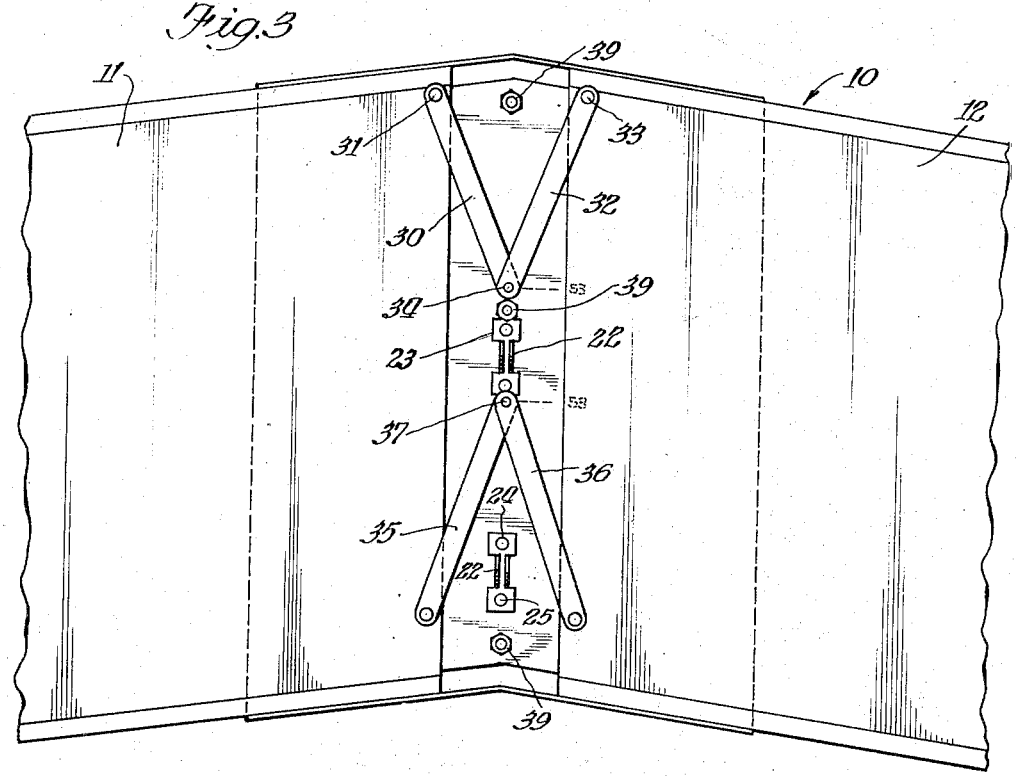

2,561,659

UNITED STATES PATENT OFFICE 2,561,659

AUTOMOBILE VISOR

Alec Greenfield, Chicago, Ill., assignor to The Greenfield Company, Chicago, Ill., a copartnership Application December 2, 1947, Serial No. 789,267

6 Claims. (Cl. 160—225)

The invention relates to sunvisors for automobiles which are mounted in front of the windshield for protection against the sun and weather.

Sun visors for automobiles extend the whole width of the vehicle so that it becomes necessary for dealers to keep a large number of assorted visors on hand to correspond to the varying widths of automobiles.

It is, therefore, an object of the invention to provide a sun visor which may be adjusted to fit any type of automobile.

It is a further object of the invention to provide an adjustable or extensible sun visor, which comprises a plurality of panels, the outer panels being connected to remain in equidistant relation to the center panel.

It is a further object to provide a scale whereby the degree of adjustment may be determined from the width of the automobile and the visor adjusted prior to applying it to the automobile.

A still further object constitutes the provision of a sun visor having a plurality of panels, the outer panels being mounted for slidable movement of the center panel, there being means for securing the panels together after adjustment preparatory to installing the visor on a car.

It is also an object of the invention to provide certain features of construction and arrangement of parts tending to enhance the utility and efficiency of a device of the character specified.

With these and other important objects in view which will become apparent from the disclosure of the invention, the latter comprises the means described in the following specification, particularly pointed out in the claims forming a part thereof, and illustrated in the accompanying drawings, in which Fig. 1 is a fragmentary isometric view of the front part of an automobile to which my improved visor as been applied.

Fig. 2 is a fragmentary rear view of the visor.

Fig. 3 is a view similar to Fig. 2 with the holding plate removed to disclose interior construction.

Fig. 4 is a section on the line 4—4 of Fig. 2.

Fig. 5 is a section on the line 5—5 of Fig. 2, and

Fig. 6 is a section on the line 6—6 of Fig. 2.

The sun visor generally designated by 10 comprises outer panels 11 and 12, each of which at the outer end is formed with a downwardly extending bracket arm 14 formed with an enlarged portion 15 adapted to extend into the rain gutter 16. A clamping plate 17 engaging the outer side of the gutter secures the arm thereto, as more fully explained in my application, Serial Number 717,513, filed December 20th, 1946 now Patent Number 2,500,406, issued March 14, 1950.

However, any other method of securing the outer panels to the rain gutter may be adopted.

A central panel 18 is formed with a flange 19 at the top and bottom of the panel 18 and extending at right angles thereto and the outer panels are adapted to engage the rear face of the center panel and slide between the flanges 19.

The edges of the outer panels 11, 12 are folded upon themselves as at 20 to provide reinforced edges which are received in guide grooves formed by depressions 21 (Fig. 6).

The center brace is provided with a pair of clips 22 formed integral with a base plate 23 (Fig. 3) secured to the center plate by rivets 24 and 25, a link 26 is pivotally connected to each clip and is provided with clamping jaws 27 to securely engage the center rod 28 of the windshield 29 (Fig. 1).

A link 30 is pivotally secured to the outer panel 11 as at 31 and a link 32 is pivotally secured to the panel 12 as at 33. The free ends of links 30 and 32 are connected by an upright stud bolt 34.

Similarly links 35 and 36 are pivotally connected to panels 11 and 12 respectively and their free ends are connected by a stud bolt 37.

A cover plate 38 co-extensive with the central panel 18 fits between the flanges 19 thereof, and is secured to the central panel by screws 39.

The cover plate is provided with two central slots 40, 41 and its side edges 42 are bent downwardly to lie proximate to the outer panels.

The bolts 34 and 37 extend through the slots 40 and 41.

It is evident that upon adjustment of the outer panels 11 and 12 their inner ends will always remain equidistant from the central vertical axis of the visor by reason of the fact that the links 30, 32 and 35, 36 are guided in the slots 40 and 41, respectively.

The edges of the slots 40 and 42 are provided with graduation marks 43 and numerals indicating the width of the automobile. Upon adjustment of the outer panels, the bolts 34 and 37 constitute index fingers and when opposite a graduation mark they indicate the width of the extended or contracted visor.

In order to adjust the visor, nuts 44 on bolts 34 and 37 are loosened. Thereupon the outer panels are extended or contracted and after proper adjustment the nuts 44 are tightened and the visor is then ready for installation.

While the drawing shows one embodiment of the invention, numerous changes and alterations may be made within the purview of the invention.

I, therefore, do not limit myself to the details of construction and arrangement of parts, as shown, but include all revisions and modifications constituting departures within the scope of the invention, as defined in the appended claims.

I claim:

1. Improvements in panel mounting means for automobile visors of the type having a pair of elongated visor panels adjustable lengthwise relative to each other, said improved mounting means comprising, to wit: a plate overlying the adjoining ends of said panels, link means including at least two pairs of link arms in which each link has an end region pivotably connected to an inner end region of one of said visor panels, and each link has an opposite end region joined by a common pivot to a corresponding end region of another said link of the corresponding pair such that movement of said visor panels outwardly of each other tends to pivotally extend the joined link arms, while opposite movement of said panels tends to pivot the joined link arms toward each other, said plate having therein elongated channel means extending transversely of the length of said visor panels, and guide means projecting from the pivotal juncture of said joined link arms into said channel means, whereby said visor panels are linked for uniform, joint adjusting movement toward and away from each other.

2. The structure defined in claim 1 and further characterized by the provision of index indicia markings at points along said channel means and relative to which said guide means moves in predetermined relation to inward and outward movement of the visor panels for the purpose of adjusting the latter in desired positions corresponding to the designations of said markings.

3. A visor for automobiles comprising: a center panel, a pair of elongated outer panels having adjacent inner ends slidable on said center panel, a lateral plate secured to said center panel and shielding the adjacent ends of said outer panels, said outer panels being articulated by pairs of links, each link in each pair being pivotally connected to an inner end part of one of said outer panels near a longitudinal edge thereof, and the said links on corresponding longitudinal sides of said outer panels having a common pivot joining the same in pairs, said pivots being guided in lateral slot means in said plate such that said common pivots shift laterally responsive to longitudinal movements of said outer panels whereby the latter are constrained to uniform joint adjustment relative to said center panel by said links.

4. An automobile visor including a pair of elongated outer panels, central panel means supportably guiding the adjacent inner ends of said outer panels in convergent and divergent sliding movements for elongation or shortening of the visor width, at least two pairs of laterally spaced pivot links respectively joining adjacent lateral sides of said outer panels, the links of each said pair having a common intermediate pivotal juncture guided for lateral shifting on said central panel means whereby said outer panels are joined for joint uniform sliding movement as aforesaid.

5. An adjustable visor comprising a central panel structure consisting of a pair of spaced plates defining a guide, a pair of outer panels each having an inner end part slidably received between said central panel plates for relatively divergent and convergent movement to adjust the span of the visor, link means pivotally connected with said inner end parts of the outer panels and having a common intermediate pivot means guided on said central panel structure for movement laterally of the adjusting movements of the outer panels, whereby the latter are constrained to joint uniform adjusting movements as aforesaid relative to said central panel structure.

6. An adjustable visor for automobiles, comprising a center panel, outer panels slidable on said center panel, means for guiding and uniformly coordinating the sliding motion of said outer panels relative to the center panel and including a plate secured to said center panel and covering the inner ends of said outer panels, and pairs of pivotally joined links each pair having a connecting pivot movably secured to said plate to shift laterally of said outer panels, each link of each pair being pivotally engaged at a point remote from its corresponding pivotal juncture with its companion link to an inner end portion of one of said outer panels whereby the latter are articulated for simultaneous and uniform adjusting movement toward and away from said center panel.

ALEC GREENFIELD.

REFERENCES CITED

The following references are of record in the file of this patent:

UNITED STATES PATENTS

| Number | Name | Date |
|---|---|---|
| 497,193 | Monaghan et al. | May 9, 1893 |
| 1,584,364 | Fuller | May 11, 1926 |
| 2,334,856 | Atkinson | Nov. 23, 1943 |